United States Patent
Kurosawa et al.

(10) Patent No.: US 9,951,745 B2
(45) Date of Patent: Apr. 24, 2018

(54) AXIAL FLOW WATER TURBINE

(71) Applicant: KABUSHIKI KAISHA TOSHIBA, Minato-ku (JP)

(72) Inventors: Sadao Kurosawa, Yokohama (JP); Kazuyuki Nakamura, Yokohama (JP); Pohan Ko, Yokohama (JP); Koichiro Shimizu, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 896 days.

(21) Appl. No.: 14/220,390

(22) Filed: Mar. 20, 2014

(65) Prior Publication Data
US 2014/0322004 A1  Oct. 30, 2014

(30) Foreign Application Priority Data
Apr. 24, 2013  (JP) .................................. 2013-091729

(51) Int. Cl.
*F03B 3/12*  (2006.01)

(52) U.S. Cl.
CPC ............. *F03B 3/121* (2013.01); *Y02E 10/223* (2013.01)

(58) Field of Classification Search
CPC .................................. F03B 3/121; F01D 9/02
USPC ...................................................... 415/208.1
See application file for complete search history.

(56) References Cited

FOREIGN PATENT DOCUMENTS

| JP | 33-17607 B | 10/1958 |
|---|---|---|
| JP | 63-112278 U | 7/1988 |
| JP | 2000-274341 A | 10/2000 |
| JP | 2005-315216 | 11/2005 |
| JP | 2013-24181 A | 2/2013 |

OTHER PUBLICATIONS

Combined Office Action and Search Report dated Jan. 20, 2016 in Chinese Patent Application No. 201410151839.5 (with English language translation).
Office Action dated Oct. 28, 2016 in Japanese Patent Application No. 2013-091729 (with English language translation).
Combined Chinese Office Action and Search Report dated Aug. 19, 2016 in Patent Application No. 201410151839.5 (with Partial English translation and English translation of categories of cited documents).

*Primary Examiner* — Richard Edgar
*Assistant Examiner* — Michael Sehn
(74) *Attorney, Agent, or Firm* — Oblon, McClelland, Maier & Neustadt, L.L.P.

(57) ABSTRACT

An axial flow water turbine according to an embodiment includes a discharge ring and a runner vane. When seen in the runner meridional cross section, a straight line that passes a border between a cylindrical surface and a spherical surface of the discharge ring and that is perpendicular to a water turbine rotation axis is denoted as A. A crossing point between the straight line A and the water turbine rotation axis is denoted as B. A straight line inclined by an angle θ of 10 degrees or less is denoted as C. A cross point between the straight line C and the external peripheral end surface of the runner vane is denoted as D. In this case, the external peripheral end of the forward edge of the runner vane is located on the crossing point D.

3 Claims, 6 Drawing Sheets

AXIAL FLOW WATER TURBINE

CROSS REFERENCE TO RELATED APPLICATIONS

The present invention is based on, and claims priority from, Japanese Patent Application No. 2013-91729 filed on Apr. 24, 2013, the entire contents of which are hereby incorporated by reference.

FIELD

Embodiments of the present invention relates to a configuration of a runner of an axial flow water turbine.

BACKGROUND

A partial cross section (meridional cross sectional view) illustrating a hydroelectric power station provided with a Kaplan water turbine which is a typical axial flow water turbine is shown in FIG. 8. Water current that flows from the upstream into a casing 1 passes through a stay vane 2, and flows through a guide vane 3 having the open/close function for adjusting the flow rate of water, and reaches a runner that is coupled with an electric power generator by means of a main shaft. This flowing water causes a runner to rotate about a water turbine rotation axis 5. The runner has a runner boss 10 and multiple runner vanes 4 attached thereto. Accordingly, the electric power generator is rotated and electric power is generated. The flow that has flown out of the runner passes through a draft tube, and is discharged to the downstream or a lower reservoir. The runner vanes 4 of the Kaplan water turbine rotate about the vane rotation axis 6 in accordance with the flow rate of water.

There is a gap between a runner vane 4 and a discharge ring 9, and therefore, there is leakage flow passing through the gap. Because of the rate of the leakage flow, the fluid force exerted on the runner vane 4 cannot be collected, and when the leakage flow is large, the loss increases.

When the runner vanes 4 do not overlap each other when the runner vane is seen in the section perpendicular to the water turbine rotation axis 5, through flow that does not exert on the runner vane 4 is generated at the outer peripheral side (chip portion side) where the velocity of the flow is particularly fast. Because of the influence of the leakage flow due to the gap between the runner vane 4 and the discharge ring 9 and the through flow, the velocity of the flow in the exit of the runner vane 4 is likely to be disturbed at the chip portion side, the disturbed flow cannot sufficiently recover pressure in the draft tube, and the performance decreases. In FIG. 8, hatching in the chip portion of the runner vane 4 indicates disturbance of vane surface flow caused by the leakage flow.

In FIG. 8, the posture of the runner vane 4 corresponding to the design point is indicated by a chain double-dashed line, and the posture of the runner vane 4 corresponding to high flow rate operation point is indicated by a solid line. In FIG. 8, the external peripheral end surface 7 (this is a spherical surface) of the runner vane 4 that is at the posture in the design point when seen in the direction of the vane rotation axis 6, is indicated by a chain double-dashed line (denoted with reference numeral 7A), and the external peripheral end surface 7 that is at the posture in the high flow rate operation point is indicated by a solid line (denoted with reference numeral 7B). When the operability in the disassembly and assembly of the runner vane 4 is considered, the discharge ring 9 is manufactured, in most cases in recent years, so that the upstream side inner peripheral surface is a cylindrical surface, and the downstream side inner peripheral surface is a spherical surface. Therefore, the size of the gap G between the runner vane 4 and the discharge ring 9 is large at the upstream side, and is larger when the runner vane 4 is at the posture in the high flow rate operation point than when the runner vane 4 is at the posture in the design point. For this reason, the loss due to the leakage flow explained above is high in the high flow rate operation point, and this is the main cause why the efficiency is reduced in the high flow rate operation point.

Due to the influence of the centrifugal force, the flow is likely to deviate to the external peripheral side (chip portion side), and in addition, the velocity of the flow is high at the external peripheral side, and therefore, the pressure is reduced at the negative pressure surface (back surface) of the runner vane 4. For this reason, cavitation is likely to be generated at this portion where there is the gap between the runner vane 4 and the discharge ring 9, and cavitation erosion is likely to be generated. In order to extend the life of the runner vane 4, it is important to suppress the cavitation and to reduce the loss that causes the reduction of the performance.

DETAILED DESCRIPTION

According to an embodiment, an axial flow water turbine is provided, which includes a discharge ring in which an upstream side inner peripheral surface is formed as a cylindrical surface and a downstream side inner peripheral surface is formed as a spherical surface, and a runner vane that is provided inside of the discharge ring and that is formed such that an external peripheral end surface is formed as a spherical surface. This axial flow water turbine is configured such that, when seen in the runner meridional cross section, a straight line that passes a border between the cylindrical surface and the spherical surface of the discharge ring and that is perpendicular to the water turbine rotation axis is denoted as A, a crossing point between the straight line A and the water turbine rotation axis is denoted as B, a straight line inclined by an angle θ of 10 degrees or less that is obtained by rotating the straight line A to the upstream side about the crossing point B is denoted as C, a cross point between the straight line C and the external peripheral end surface of the runner vane is denoted as D, and in this case, the external peripheral end of the forward edge of the runner vane is located on the crossing point D.

Figure 8:
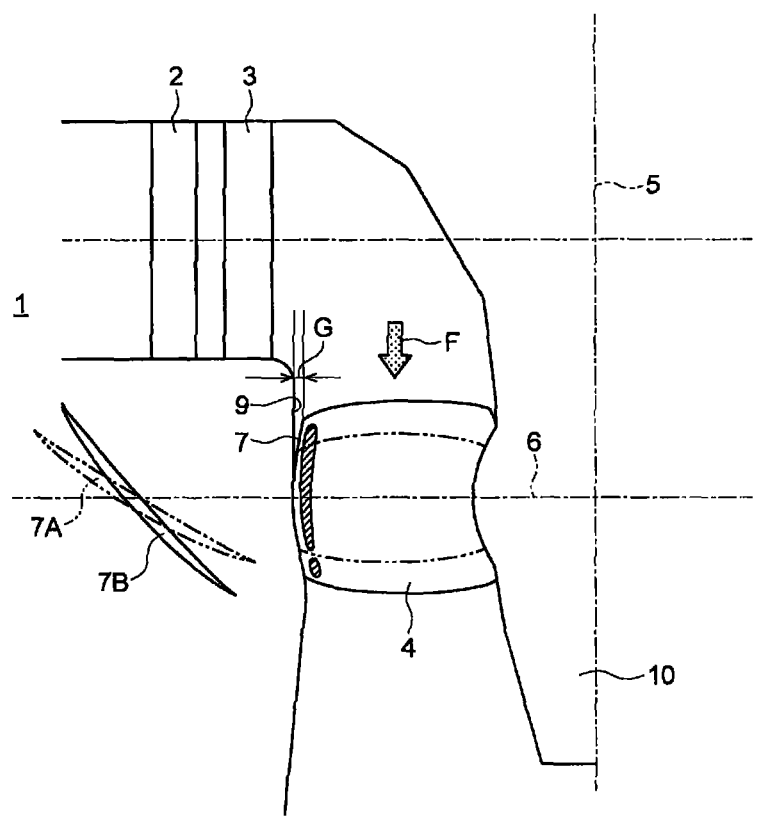
FIG. 8 is a partial cross section illustrating a general configuration of an axial flow water turbine (Kaplan water turbine).

An embodiment of an axial flow water turbine will be hereinafter explained with reference to drawings. In the drawings of the embodiments, the same elements as those shown in FIG. 8 are denoted with the same reference numerals, and repeated explanation thereabout is omitted. A thick arrow F indicates water current (main flow).

[First Embodiment]

Figure 1:
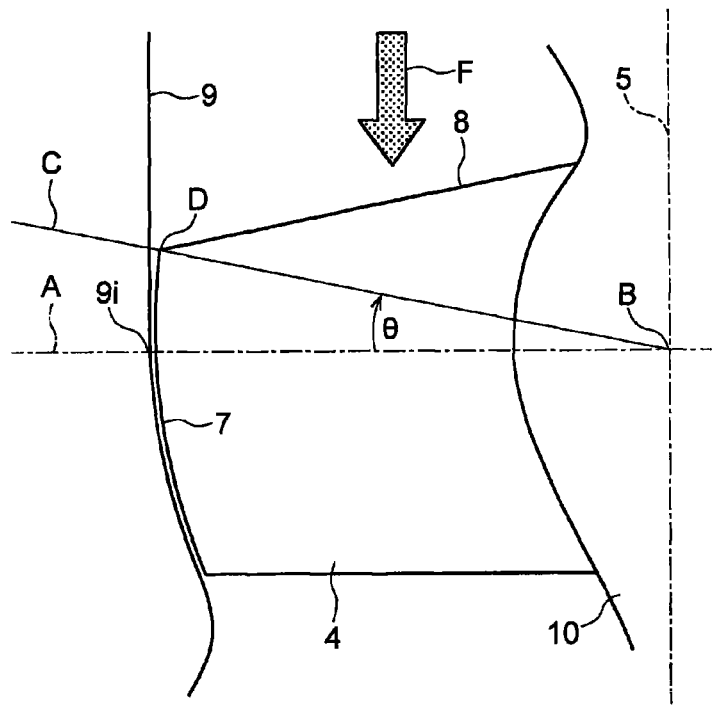
FIG. 1 is runner meridional cross sectional view illustrating a first embodiment.

First, the first embodiment will be explained. FIG. 1 illustrates a runner meridional shape with the opening degree of the runner vane in the design point. The basic structure of the runner is the same as a conventional one (the one illustrated in FIG. 8), and the runner vane 4 according to the present embodiment is formed such that:

when seen in the runner meridional cross section, a straight line that passes a border 9i, between the cylindrical surface at the upstream side and the spherical surface of the downstream side, of the inner peripheral surface of the discharge ring 9 and that is perpendicular to the water turbine rotation axis 5 (this straight line is a horizontal line in a case where the rotation axis of the water turbine is a vertical axis) is denoted as A, a crossing point between the straight line A and the water turbine rotation axis 5 is denoted as B, a straight line inclined by an angle θ of 10 degrees or less that is obtained by rotating the straight line A to the upstream side about the crossing point B is denoted as C, a cross point between the straight line C and the external peripheral end surface 7 of the runner vane 4 (this is a spherical surface) is denoted as D, and in this case, the external peripheral end of the forward edge 8 of the runner vane 4 is located on the crossing point D.

Figure 2:
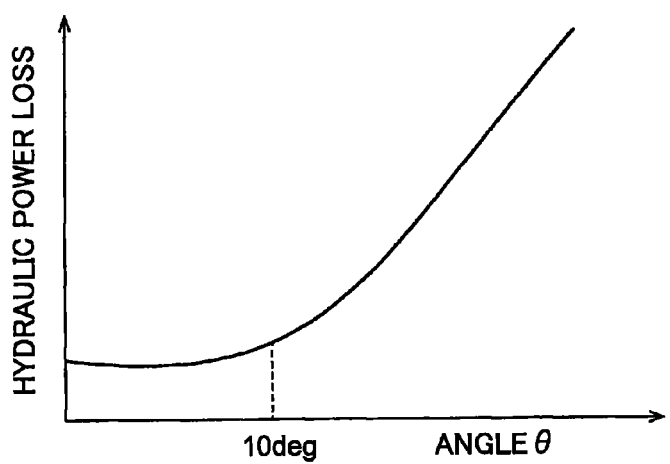
FIG. 2 is a graph illustrating relationship between the forward edge position of the external peripheral end of the runner vane and a hydraulic power loss.

FIG. 2 illustrates a finding obtained by performing flow analysis regarding relationship between an angle θ and hydraulic power loss, where the angle formed between the straight line A and the straight line C is denoted as θ. As can be seen from FIG. 2, when the angle θ becomes more than 10 degrees, the loss rapidly increases. The reason why such phenomenon occurs is discovered by visualization analysis of flow that is achieved by the inventor. More specifically, the reason why such phenomenon occurs is that, when the flow rate of the leakage flow passing between the runner vane 4 and the discharge ring 9 increases to a somewhat high level, new flow disturbance is induced at the runner downstream portion while the leakage flow is not attenuated. According to the first embodiment, the angle θ is limited to 10 degrees or less, so that the size of the gap between the cylindrical surface of the discharge ring 9 and the external peripheral end surface 7 of the runner vane is limited, and this can greatly reduce the loss caused by the leakage flow, and further, this can reduce generation of cavitation caused by the leakage flow.

[Second Embodiment]

Figure 3:
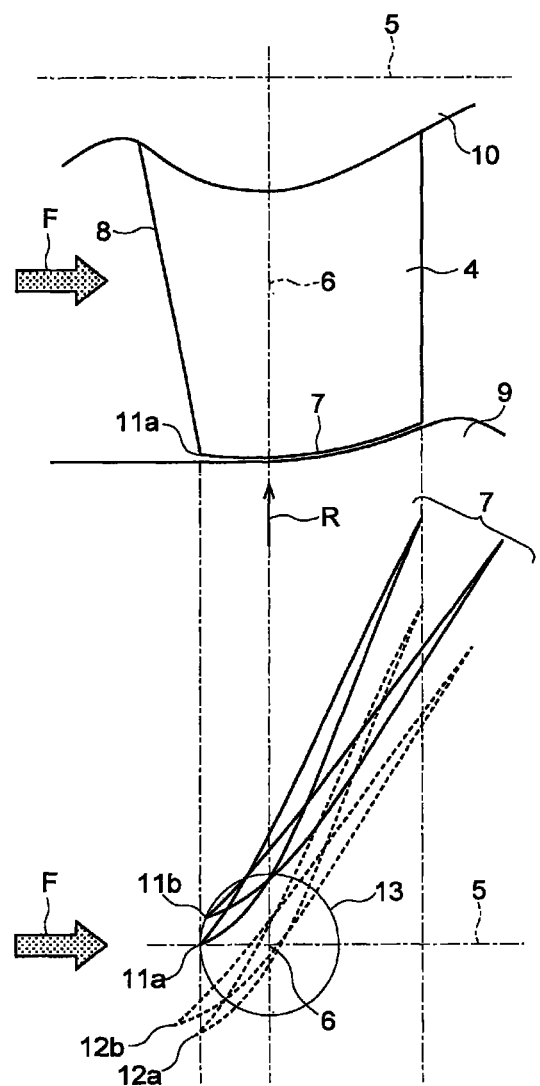
FIG. 3 is a runner meridional cross sectional view and an arrow view that is seen in the direction of the vane rotation axis illustrating a second embodiment.

Subsequently, the second embodiment will be explained with reference to FIGS. 3 to 5. The upper area of FIG. 3 illustrates a meridional cross section of a runner including a runner vane 4 and a discharge ring 9. The lower area of FIG. 3 illustrates the shape of an external peripheral end surface 7 of the runner vane 4 when seen in the direction of the vane rotation axis 6 of the runner vane 4 (arrow R direction). More specifically, the lower area of FIG. 3 illustrates the external peripheral end surface 7 of the runner vane, which is the spherical surface, projected in parallel onto the plane perpendicular to the vane rotation axis 6.

The second embodiment includes all the configurations of the first embodiment. In addition, in the second embodiment, the external peripheral end surface 7 of the runner vane is arranged at a position deviated to the pressure surface side of the runner vane 4, as indicated by the solid lines in the lower area of FIG. 3 and FIG. 4. In a general runner vane in the past, when seen in the vane rotation axis 6 of the runner vane, the runner vane rotation axis 6 is located on a camber line CL' in a airfoil shape of the external peripheral end surface 7 of the runner vane (see FIG. 4) indicated by a broken line in the lower area of FIG. 3 and FIG. 4. In this case, when the runner vane is rotated about the runner vane rotation axis 6 from the posture in the design point (the angle position corresponding to the design point) to the posture in the high flow rate operation point (the angle position corresponding to the high flow rate operation point) (see the lower area of FIG. 3), then the external peripheral end of the forward edge 8 of the runner vane 4 moves to the upstream side from the position indicated by reference numeral 12a to the position indicated by reference numeral 12b in the lower area of FIG. 3. As described above, the external peripheral end surface 7 of the runner vane 4 is the spherical surface and the upstream side inner peripheral surface of the discharge ring 9 is the cylindrical surface, and therefore, with the movement of the external peripheral end of the forward edge 8 of the runner vane 4, the size of the gap between the discharge ring 9 and the external peripheral end of the forward edge 8 of the runner vane 4 is increased. Therefore, the leakage flow increases in the high flow rate operation point.

Figure 4:
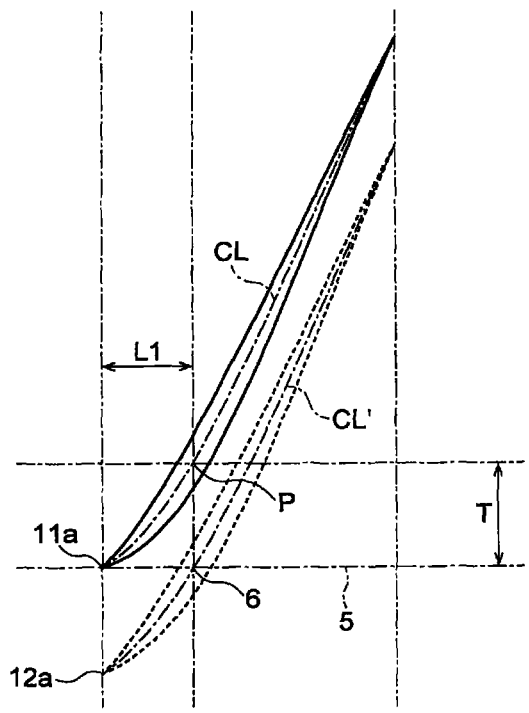
FIG. 4 is an arrow view that is seen in the direction of the vane rotation axis illustrating the second embodiment.
Figure 5:
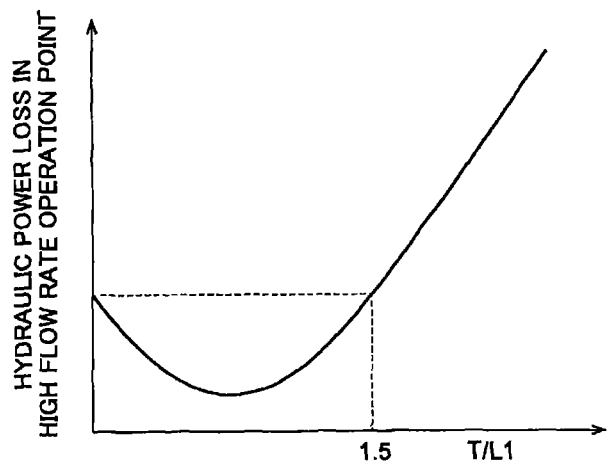
FIG. 5 is a graph illustrating relationship between the peripheral direction movement amount of the external, peripheral end of the runner vane and a hydraulic power loss in the high flow rate operation point.

On the other hand, according to the second embodiment, as indicated by the solid line in the lower area of FIG. 3 and FIG. 4, the external peripheral end surface 7 of the runner vane 4 is arranged at a position deviated, by the amount of movement T (see FIG. 4), to the runner pressure surface side (upper side in the lower area of FIG. 3 and FIG. 4) with respect to the vane rotation axis 6. More specifically, as illustrated in FIG. 4, when seen in the direction of the vane rotation axis 6, the camber line CL in the airfoil shape of the external peripheral end surface 7 of the runner vane 4 is located at a position deviated to the pressure surface side of the runner vane 4 from the vane rotation axis 6. In this configuration, in the drawings of the lower area of FIG. 3 and FIG. 4, an angle (which will be hereinafter referred to as angle φ) formed by the straight line connecting the vane rotation axis 6 and the external peripheral end (11a, 11b) of the forward edge 8 of the runner vane 4 at the posture in the design point and the straight line extending in the flow direction (the straight line corresponding to the water turbine rotation axis 5 in the lower area of FIG. 3) is small. When the runner vane 4 is rotated about the runner vane rotation axis 6 from the angle position corresponding to the design point to the angle position corresponding to the high flow rate operation point, the external peripheral end of the forward edge 8 of the runner vane 4 moves from the position denoted as 11a to the position denoted as 11b in the drawings along a circle 13 having the center at the runner vane rotation axis 6. However in the second embodiment, the angle φ is small (in the example of the drawing, this changes around zero degrees) as compared with a conventional example, and therefore, the amount of movement, in the flow direction, of the external peripheral end of the forward edge 8 of the runner vane 4 determined by "COS (φ+Δφ)− COS φ" is extremely small. For this reason, even when the runner vane 4 moves from the posture in the design point to the posture in the high flow rate operation point, the dimension of the gap, at the upstream side, between the runner vane 4 and the discharge ring 9 does not extremely increase. Therefore, according to the second embodiment, in a wider operation flow amount range, the loss and the cavitation due to the leakage flow can be reduced more effectively.

When the amount of movement T is too much, the dimension of the gap, at the downstream side, between the runner vane 4 and the discharge ring 9 during the high flow rate operation becomes too large, and the loss increases on the contrary. For this reason, in order to reliably achieve the effects of the second embodiment, it is necessary to keep the amount of movement T within the runner vane 4 into an appropriate range. This feature will be hereinafter explained with reference to FIGS. 4 and 5.

As explained above, in FIG. 4, a solid line indicates the external peripheral end surface 7 of the runner vane projected in parallel onto the plane perpendicular to the vane rotation axis 6 when the runner vane 4 according to the second embodiment is at the posture in the design point. On the plane of FIG. 4 (projection plane), a crossing point between the camber line CL in the airfoil shape of the external peripheral end surface 7 of the runner vane 4 and the straight line perpendicular to the water turbine rotation axis 5 passing through the vane rotation axis 6 is defined as P, and the distance between the point P and the runner vane rotation axis 6 is defined as the amount of movement T of the runner vane 4. The distance to the point P from the forward edge 11a in the airfoil shape of the external peripheral end surface 7 of the runner vane 4 (this corresponds to the external peripheral end of the forward edge 8 of the runner vane 4) measured in the direction of the water turbine rotation axis 5 is denoted as L1. The relationship between the amount of movement T/L1 made into dimensionless by dividing the amount of movement T by the distance L1 and the hydraulic power loss in the high flow rate operation point was researched by flow analysis. The finding thereof is shown in FIG. 5, and as can be understood from FIG. 5, it is optimum to satisfy T/L1<1.5. In FIG. 4, the forward edge 11a in the airfoil shape is drawn so as to be located on the water turbine rotation axis 5, but it may be at a position away from the water turbine rotation axis 5.

[Third Embodiment]

Figure 6A:
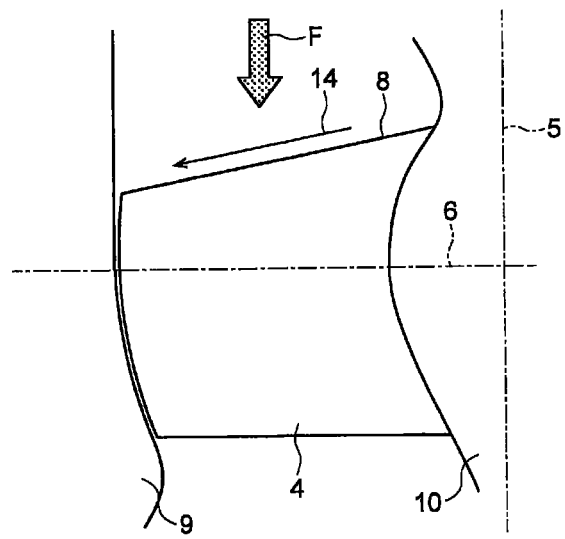
FIGS. 6A and 6B are runner meridional cross sectional views illustrating a third embodiment.
Figure 6B:
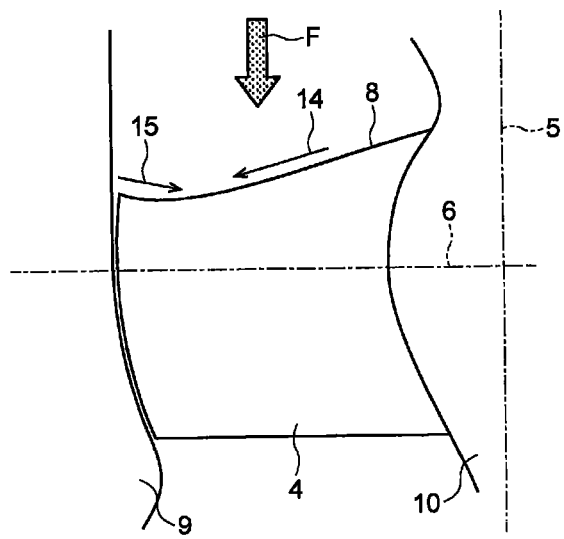

Subsequently, the third embodiment will be explained with reference to FIGS. 6A and 6B. FIGS. 6A and 6B illustrate a runner meridional cross section when the runner vane 4 is at the posture in the design point. This third embodiment includes all the configurations of the first embodiment, but the third embodiment is different from the first embodiment in that the forward edge 8 of the runner vane 4 is curved in a concave shape toward the downstream side. Like the first embodiment (see FIG. 2), when the external end of the forward edge 8 of the runner vane 4 is sweptback to the downstream side, and the forward edge 8 of the runner vane 4 has a straight line form, then an outward flow 14 (see FIG. 6A) is generated along the forward edge 8 of the runner vane 4 due to the wing sweep-back angle effect. This disturbs the leakage flow explained above, which increases the loss.

According to the third embodiment, the forward edge 8 of the runner vane 4 is made into a shape so as to be curved in a concave shape toward the downstream side, so that an inward flow 15 as illustrated in FIG. 6B is generated due to wing advance angle effect around the external peripheral end of the forward edge of the runner vane 4, and this acts to cancel the outward flow 14 along the forward edge 8 of the runner vane 4. For this reason, as compared with the first embodiment, the disturbance of the flow due to the leakage flow and the loss caused by the flow can be reduced more effectively.

Figure 7A:
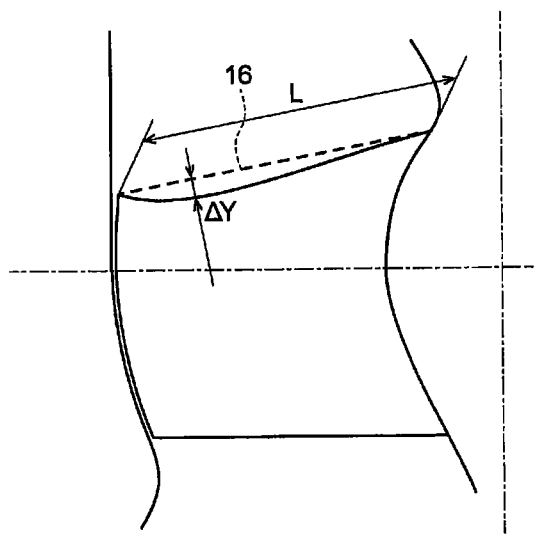
FIGS. 7A and 7B are graphs illustrating relationship between the amount of curvature in the forward edge of the runner vane and a hydraulic power loss.
Figure 7B:
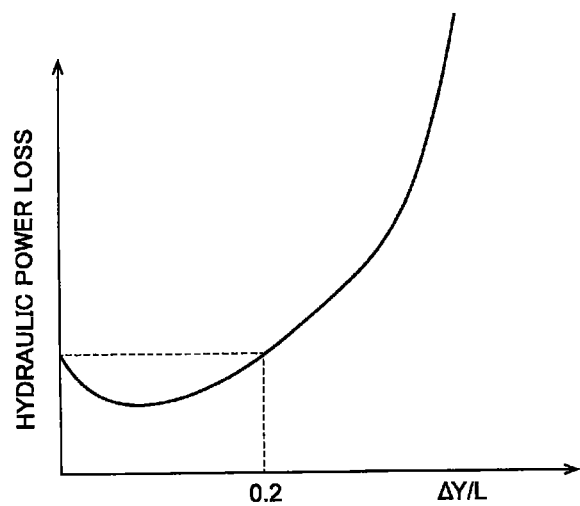

When the amount of curvature of the forward edge 8 is too much, the outward flow 14 generated in the runner central portion and the inward flow 15 generated in the external peripheral portion become too intense, the flow itself may disturb the runner inside flow, and the loss is increased on the contrary. For this reason, in order to reliably achieve the effect of the invention of the third embodiment, the amount of curvature of the forward edge of the runner vane needs to be at an appropriate amount. In this case, as shown in FIG. 7A which is a runner meridional cross section when the runner vane 4 is at the posture in the design point, the amount of bend is defined as a maximum distance $\Delta Y$ from a line segment 16 to the forward edge 8 of the runner vane 4, that is measured in a direction perpendicular to the line segment 16 (indicated by a broken line) connecting the inner peripheral end of the forward edge of the runner vane and the external peripheral end. The finding obtained by means of flow analysis regarding the relationship between the loss and the amount of curvature $\Delta Y/L$ that is made into dimensionless by dividing the maximum distance $\Delta Y$ by the length L of the line segment 16 is shown in FIG. 7B. As can be seen from FIG. 7B, it is optimum to satisfy "$\Delta Y/L<0.2$". It should be noted that the features of the second embodiment may be incorporated into the third embodiment.

According to the above embodiments, the water turbine performance is improved by the reduction of the leakage flow caused by the gap between the runner vane and the discharge ring, and the cavitation erosion generated in proximity to the gap can be reduced.

While certain embodiments have been described, these embodiments have been presented by way of example only, and are not intended to limit the scope of the inventions. Indeed, the novel embodiments may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. For example, the features of the above embodiments cannot only be applied to a Pelton water turbine but also various types of the axial flow water turbine.

The invention claimed is:

1. An axial flow water turbine, comprising:
a discharge ring in which an upstream side inner peripheral surface is formed as a cylindrical surface and a downstream side inner peripheral surface is formed as a spherical surface, and a runner vane that is provided inside of the discharge ring and that is formed such that an external peripheral end surface is formed as a spherical surface,
wherein when seen in a runner meridional cross section in a design point,
a first straight line that passes a border between the cylindrical surface and the spherical surface of the discharge ring and that is perpendicular to a water turbine rotation axis is denoted as A,
a first crossing point between the first straight line A and the water turbine rotation axis is denoted as B,
a second straight line inclined by an angle θ of more than 0 degrees and of 10 degrees or less, that is obtained by rotating the first straight line A to the upstream side about the first crossing point B, is denoted as C, a second crossing point between the second straight line C and the external peripheral end surface of the runner vane is denoted as D, and in this case, the external peripheral end of a forward edge of the runner vane is located on the second crossing point D, and an inner peripheral end of the forward edge of the runner vane is located at the upstream side with respect to the second straight line C, wherein when seen in a direction of a vane rotation axis of the runner vane, a camber line in an airfoil shape of the external peripheral end surface of the runner vane is arranged at a position deviated to a pressure surface side of the runner vane with respect to a vane rotation axis, when seen in the direction of the vane rotation axis of the runner vane, a point where a straight line extended from the vane rotation axis to the pressure surface side in a direction perpendicular to a direction of the water turbine rotation axis crosses a camber line in an airfoil shape of the external peripheral end surface of the runner vane is denoted as P, and a distance from the vane rotation axis to the point P is denoted as T, and a distance to the point P from the forward edge in the airfoil shape measured along the direction of the water turbine rotation axis is denoted as L1, and the runner vane is arranged to satisfy a relationship T/L1 <1.5.

2. The axial flow water turbine according to claim 1, wherein when seen in a runner meridional cross section, the forward edge of the runner vane is curved so as to be concave toward a downstream side.

3. The axial flow water turbine according to claim 2, wherein when seen in the runner meridional cross section, a length of a line segment connecting an inner peripheral end of the forward edge of the runner vane and an external peripheral end is denoted as L, a maximum distance from the line segment to the forward edge of the runner vane measured in a direction perpendicular to the line segment is denoted as ΔY, and in this case, the forward edge of the runner vane is curved so as to satisfy a relationship ΔY/L <0.2.

* * * * *